(12) United States Patent
Matsuda et al.

(10) Patent No.: US 7,530,868 B2
(45) Date of Patent: May 12, 2009

(54) VERTICAL POWER UNIT AND OUTBOARD ENGINE SYSTEM

(75) Inventors: Yoshiyuki Matsuda, Saitama (JP); Shinichi Ide, Saitama (JP); Yoshimi Watanabe, Saitama (JP); Takahiro Miyata, Shizuoka (JP); Tokuji Yoshimoto, Shizuoka (JP)

(73) Assignees: Honda Motor Co., Ltd., Tokyo (JP); Yutaka Giken Co., Ltd., Shizuoka (JP)

( * ) Notice: Subject to any disclaimer, the term of this patent is extended or adjusted under 35 U.S.C. 154(b) by 0 days.

(21) Appl. No.: 11/802,926

(22) Filed: May 25, 2007

(65) Prior Publication Data
US 2007/0298665 A1 Dec. 27, 2007

(30) Foreign Application Priority Data
May 25, 2006 (JP) .............................. 2006-145979
May 25, 2006 (JP) .............................. 2006-145980

(51) Int. Cl.
*B63H 23/00* (2006.01)

(52) U.S. Cl. ..................... 440/75; 74/730.1; 192/3.21

(58) Field of Classification Search ................. 440/75, 440/76; 74/730.1; 192/3.21; 123/198 C; 417/360, 364
See application file for complete search history.

(56) References Cited

U.S. PATENT DOCUMENTS

| 3,407,600 | A | | 10/1968 | Meyer | |
|---|---|---|---|---|---|
| 4,592,203 | A | * | 6/1986 | Stubbs | ........................ 60/358 |
| 4,802,871 | A | | 2/1989 | Watanabe | |
| 2003/0136221 | A1 | | 7/2003 | Hori | |
| 2008/0014805 | A1 | * | 1/2008 | Ide et al. | ....................... 440/76 |

FOREIGN PATENT DOCUMENTS

| EP | 1 106 894 A1 | 6/2001 |
|---|---|---|
| EP | 1 302 700 A | 4/2003 |
| JP | 2002005951 | 1/2002 |

* cited by examiner

*Primary Examiner*—Lars A Olson
(74) *Attorney, Agent, or Firm*—Arent Fox LLP

(57) ABSTRACT

A vertical power unit includes an input shaft and an output shaft which have axes in the vertical direction and are vertically arranged to each other; and a torque converter between the input shaft and the output shaft. The output shaft includes an upper output shaft connected to a turbine runner and a lower output shaft connected to the upper output shaft. An oil tank and an oil pump are provided outside the torque converter. The upper output shaft is provided with a vertical hole which communicates at an upper end with a circulation circuit of the torque converter so as to introduce the oil discharged by the oil pump into the circulation circuit, and a bottom wall which closes a lower end of the vertical hole. Thus, an working oil is constantly supplied to the circulation circuit of the torque converter through the interior of the output shaft, thereby cooling the working oil in the circulation circuit, and improves maintainability of loading devices driven by the output shaft.

11 Claims, 5 Drawing Sheets

VERTICAL POWER UNIT AND OUTBOARD ENGINE SYSTEM

RELATED APPLICATION DATA

The present invention is based upon Japanese priority application Nos. 2006-145979 and 2006-145980, which are hereby incorporated in their entirety herein by reference.

BACKGROUND OF THE INVENTION

1. Field of the Invention

The present invention relates to a vertical power unit and an outboard engine system comprising: an engine which has a vertically arranged crankshaft; a vertically arranged output shaft provided below the crankshaft; and a torque converter disposed between the crankshaft and the output shaft, the torque converter including: a pump impeller connected to the crankshaft; a turbine runner connected to the output shaft so as to opposed to the pump impeller; a stator arranged between the pump impeller and the turbine runner; and a circulation circuit of a power transmission oil, the circuit being defined between the pump impeller, turbine runner and stator; and a vertical hole which is provided in the output shaft and which communicates at an upper end with the circulation circuit so as to introduce the oil discharged by the oil pump into the circulation circuit.

2. Description of the Related Art

U.S. Pat. No. 3,407,600 discloses a vertical power unit and an outboard engine system which includes an engine having a vertically arranged crankshaft, a vertically arranged output shaft below the crankshaft, and a torque converter disposed between the crankshaft and the output shaft.

In the vertical power unit and the outboard engine system disclosed in U.S. Pat. No. 3,407,600, the torque converter includes a built-in oil reservoir for storing an working oil, and a sealed-type circulation circuit. Therefore, the torque converter inevitably becomes large to increase the weight, while enlarging a surrounding part. Further, the working oil in the sealed-type torque converter obtains a poor cooling, thereby accelerating deterioration of the oil.

SUMMARY OF THE INVENTION

The present invention has been achieved in view of the above circumstances, and has an object to provide a vertical power unit and an outboard engine system wherein an oil reservoir is separated from a torque converter and oil in the oil reservoir is constantly supplied to a circulation circuit of the torque converter through an interior of an output shaft, thereby downsizing the torque converter and cooling the working oil in the circulation circuit, and also providing an excellent maintainability of loaded devices which are driven by the output shaft.

In order to achieve the above object, according to a first feature of the present invention, there is provided a vertical power unit and an outboard engine system comprising: an engine which has a vertically arranged crankshaft; a vertically arranged output shaft provided below the crankshaft; and a torque converter disposed between the crankshaft and the output shaft, the torque converter including: a pump impeller connected to the crankshaft; a turbine runner connected to the output shaft so as to opposed to the pump impeller; a stator arranged between the pump impeller and the turbine runner; and a circulation circuit of a power transmission oil, the circuit being defined between the pump impeller, turbine runner and stator, wherein the output shaft comprises an upper output shaft connected to the turbine runner and a lower output shaft separably connected to the lower end portion of the upper output shaft; wherein the vertical power unit further comprises, outside the torque converter, an oil tank, and an oil pump for drawing up oil in the oil tank; and wherein the upper output shaft is provided with a vertical hole which communicates at an upper end with the circulation circuit so as to introduce the oil discharged by the oil pump into the circulation circuit, and a bottom wall which closes a lower end of the vertical hole.

With the first feature of the present invention, the oil tank is provided outside the torque converter and the oil in the oil tank is drawn up and supplied to the circulation circuit of the torque converter, thereby reducing the size and weight of the torque converter. Also, the oil discharged from the oil pump is constantly supplied through the vertical hole in the output shaft to the circulation circuit of the torque converter, thereby preventing overheating and degradation of the oil in the circulation circuit and simplifying the oil passage.

Further, the output shaft is divided into two portions: an upper output shaft and a lower output shaft which are separably coupled to each other, so that the engine, the torque converter and the upper output shaft can be compactly configured into a unit without interference by the lower output shaft.

Furthermore, in maintenance of the loaded devices which are connected to the lower output shaft, because the lower output shaft is separated from the upper output shaft, the maintenance of the loading devices can be easily performed without interference by the torque converter and the upper output shaft, thereby providing an excellent maintainability.

Moreover, because the vertical hole is provided in the upper output shaft together with the bottom wall, even when the lower output shaft is separated from the upper output shaft, it is possible to prevent the oil remained in the vertical hole from flowing out of the vertical hole, thereby further improving the maintainability.

According to a second feature of the present invention, in addition to the first feature, the upper output shaft is provided with the vertical hole, a plug hole, and a spline hole so that they axially pass through the upper output shaft; a plug is attached to the plug hole so as to serve as the bottom wall; and a spline shaft is removably fitted to the spline hole, the spline shaft being formed at an upper end of the lower output shaft.

With the second feature of the present invention, because the vertical hole, the plug hole and the spline hole axially pass through the upper output shaft, and thus, after processing of these holes, washing can advantageously reliably prevent cut chips from residing in these holes. Also, the plug fitted to the plug hole easily closes the lower end of the vertical hole.

According to a third feature of the present invention, in addition to the first or second feature, the vertical power unit further comprises: a hollow stator shaft disposed on a periphery of the upper output shaft, and is coupled to the stator via a free wheel to extend downward; and a hollow pump shaft disposed on a periphery of the stator shaft, and is coupled to the pump impeller to extend downward; and the pump shaft is supported by a support member via an upper bearing, a lower end portion of the stator shaft is fixed to the support member, and the lower output shaft is supported by a lower end portion of the stator shaft via a lower bearing. The support member corresponds to a bearing bracket 14 in embodiments of the present invention which will be described later.

With the third feature of the present invention, the pump shaft is supported by the support member via the upper bearing; the lower end of the stator shaft is fixed to the support member; and the lower end of the stator shaft supports the lower output shaft via the lower bearing. Therefore, the pump shaft, the stator shaft and the upper output shaft are reasonably supported, thereby downsizing the vertical transmission.

According to a fourth feature of the present invention, in addition to the third feature, the oil pump driven by the pump shaft is mounted to the support member between the upper and lower bearings.

With the fourth feature of the present invention, the space between the upper and lower bearings is effectively used for placing the oil pump therein, thereby downsizing the vertical transmission having the oil pump.

According to a fifth feature of the present invention, in addition to the fourth feature, the vertical power unit further comprises: an inlet oil passage extending from the support member to the stator shaft and the upper output shaft to communicate a discharge port of the oil pump with the vertical hole; and a pair of seal members which are vertically arranged to sandwich the inlet oil passage at a relatively rotatable fitted portion between the upper output shaft and the stator shaft.

With the fifth feature of the present invention, the pair of vertically arranged seal members cooperatingly prevent the oil in the inlet pump passage from flowing out of the fitted portion between the upper output shaft and the stator shaft.

According to a sixth feature of the present invention, in addition to the fifth feature, a cylindrical oil passage is defined above the pair of seal members and between the upper output shaft and the stator shaft so that oil discharged from the circulation circuit is guided to run down to a suction side of the oil pump or the oil tank.

With the sixth feature of the present invention, the space between the upper output shaft and the stator shaft is used for forming the cylindrical passage which allows the oil discharged from the circulation circuit to flow down therethrough, thereby simplifying the oil passage structure. Further, the upper seal member of the pair of seal members is cable of preventing the oil in the cylindrical passage from flowing down.

According to a seventh feature of the present invention, there is provided an outboard engine system comprising: a casing coupled to a swivel case via a swivel shaft; an engine mounted in an upper part of the casing such that a crankshaft of the engine is vertically arranged and a cylinder block of the engine faces in a direction opposite to the swivel shaft; a torque converter; a vertically arranged output shaft connected to the crankshaft through the torque converter; a horizontally arranged propeller shaft provided below the output shaft; and a forward-reverse shifting gear mechanism for providing a connection between the output shaft and the propeller shaft; the torque converter, output shaft, propeller shaft and gear mechanism being disposed in the casing, wherein the output shaft comprises an upper output shaft connected to the turbine runner and a lower output shaft separably connected to the lower end portion of the upper output shaft; wherein the vertical power unit further comprises an oil tank in the casing below the torque converter, and an oil pump for drawing up oil in the oil tank; and wherein the upper output shaft is provided with a vertical hole which communicates at an upper end with the circulation circuit so as to introduce the oil discharged by the oil pump into the circulation circuit, and a bottom wall which closes a lower end of the vertical hole.

With the seventh feature of the present invention, the torque converter and the oil tank for storing the working oil for the torque converter are formed as separated components which are arranged in the vertical direction, thereby reducing the size and weight of the casing which houses these components and also those of the outboard engine system. Further, the oil discharged by the oil pump is constantly supplied to the circulation circuit of the torque converter through the vertical hole in the output shaft, thereby preventing the overheating and degradation of the oil in the circulation circuit and simplifying the oil passage.

Further, the long output shaft is divided into two portions: the upper output shaft and the lower output shaft that are separably coupled to each other, so that the engine, the torque converter and the upper output shaft can be compactly configured into a unit without interference by the lower output shaft.

Furthermore, in maintenance of the propeller shaft and the forward-reverse shifting gear mechanism connected to the lower output shaft, because the lower output shaft can be separated from the upper output shaft, it is possible to easily perform the maintenance of the forward-reverse shifting gear mechanism and the other components without interference by the torque converter and the upper output shaft, thereby improving the maintainability.

Moreover, because the vertical hole is provided in the upper output shaft together with the bottom wall, even when the lower output shaft is separated from the upper output shaft, it is possible to prevent the oil remained in the vertical hole from flowing out of the vertical hole, thereby further improving the maintainability.

According to an eighth feature of the present invention, there is provided an outboard engine system comprising: a casing; an engine which has a vertically arranged crankshaft and is mounted in an upper part of the casing, a torque converter; a vertically arranged output shaft connected to the crankshaft through the torque converter; and a horizontally arranged propeller shaft provided below the output shaft; a forward-reverse shifting gear mechanism for providing a connection between the output shaft and the propeller shaft, the torque converter including: a pump impeller connected to the crankshaft; a turbine runner connected to the output shaft so as to be opposed to the pump impeller; a stator arranged between the pump impeller and the turbine runner; and a circulation circuit of a power transmission oil, the circuit being defined between the pump impeller, turbine runner and stator, wherein the torque converter T is mounted in the upper portion of the casing together with the engine; and wherein the casing further contains: an oil tank; an oil pump for drawing up oil stored in the oil tank; an oil supply passage for supplying the oil discharged by the oil pump to the circulation circuit; and a return passage for returning the oil in the circulation circuit to a suction side of the oil pump or the oil tank.

With the eighth feature of the present invention, the oil cooled in the oil tank is constantly supplied by the oil pump to the circulation circuit of the torque converter, thereby preventing the overheating and degradation of the oil in the circulation circuit. Further, the torque converter is mounted to the upper portion of the casing together with the engine, and the oil tank is disposed in the casing, so that an oil tank having a relatively large capacity can be disposed in the casing without interference by the engine and the torque converter, thereby increasing the amount of oil flowing into the circulation circuit to further promote the cooling of the oil.

According to a ninth feature of the present invention, in addition to the eighth feature, the casing comprises a plurality of case parts which are vertically stacked and joined to each other, and the oil tank is formed in one of the case parts.

With the ninth feature of the present invention, because the oil tank is formed in one of the plural case parts constituting the casing, the mounting of the oil tank is completed only by coupling together the plural case parts for assembling the casing, thereby simplifying the support structure and mounting procedures of the oil tank.

According to a tenth feature of the present invention, in addition to the eighth or ninth feature, the outboard engine system further comprises: a hollow stator shaft which is disposed on a periphery of the upper output shaft, and is coupled to the stator to extend downward; and a hollow pump shaft which is disposed on a periphery of the stator shaft, and is coupled to the pump impeller to extend downward; and the engine is mounted to the upper portion of the casing through a bearing bracket and a distance member, the bearing bracket supporting the pump shaft via a bearing, the distance member being connected to an upper end of the bearing bracket to surround the torque converter, and the oil pump is mounted to the bearing bracket.

With the tenth feature of the present invention, the engine can be mounted to the upper portion of the casing without interference by the torque converter supported by the bearing bracket. Further, the bearing bracket supports not only the torque converter but also the oil pump, thereby simplifying the support structure of the oil pump.

According to an eleventh feature of the present invention, in addition to any of the eighth to tenth features, the casing comprises a mount case part to which the engine is mounted together with the torque converter, an extension case part which is joined to a lower end of the mount case part and houses the output shaft, and a gear case which is joined to a lower end of the extension case part and houses the forward-reverse shifting gear mechanism and the propeller shaft; and the output shaft comprises an upper output shaft supported by the mount case part, and a lower output shaft separably connected to a lower end portion of the upper output shaft and is connected to the forward-reverse shifting gear mechanism.

With the eleventh feature of the present invention, because the output shaft is divided into the upper output shaft and the lower output shaft, the engine and the torque converter can be easily removed from the mount case part without interference by the long output shaft, and also the gear case housing the forward-reverse shifting gear mechanism can be removed from the extension case part, thereby providing an excellent maintainability.

The above-mentioned object, other objects, characteristics, and advantages of the present invention will become apparent a preferred embodiment, which will be described in detail below by reference to the attached drawings.

DESCRIPTION OF THE PREFERRED EMBODIMENT

Figure 1:
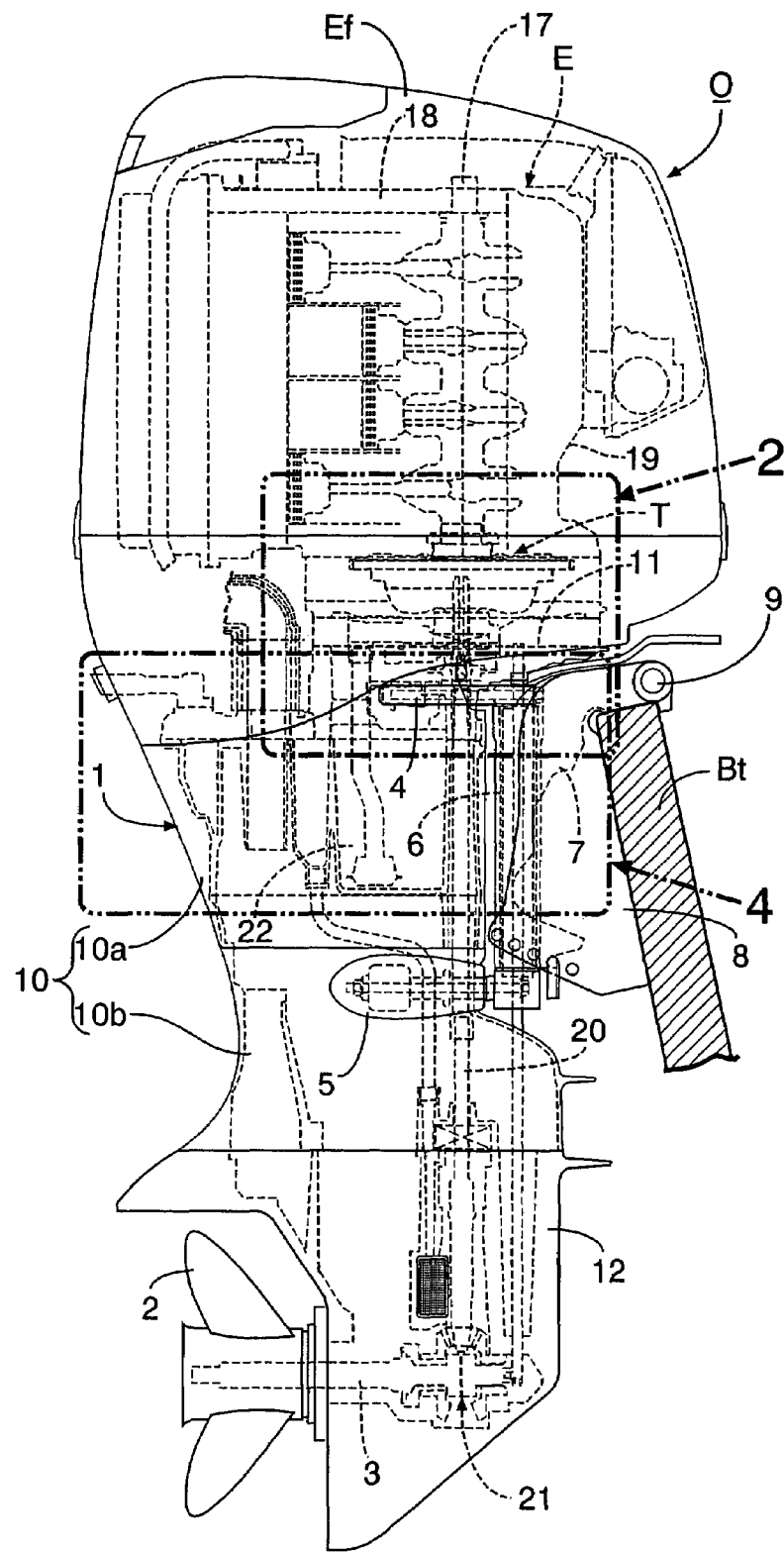
FIG. 1 is a side view showing an outboard engine system, which includes a vertical power unit, according to a first embodiment of the present invention.

A first embodiment of the present invention will be described with reference to FIGS. 1 to 6. In FIG. 1, an outboard engine system O includes a casing 1 which has a water-cooled multi-cylinder four-stroke engine E mounted in its upper portion, and supports a propeller shaft 3 at its lower portion. The propeller shaft 3 has a propeller 2 provided at its rear end. A vertically-extending swivel shaft 6 is mounted to the casing 1 via an upper arm 4 and a lower arm 5 so as to situate in front of the casing 1. The swivel shaft 6 is rotatably supported by a swivel case 7 which is coupled to a stern bracket 8 via a horizontally-extending tilt shaft 9. The stern bracket 8 is cramped to a transom Bt of a body of a ship. Therefore, the casing 1 is horizontally rotatable around the swivel shaft 6, and vertically tiltable around the tilt shaft 9. The reference numeral Ef denotes a removable engine hood for covering the engine E.

Figure 2:
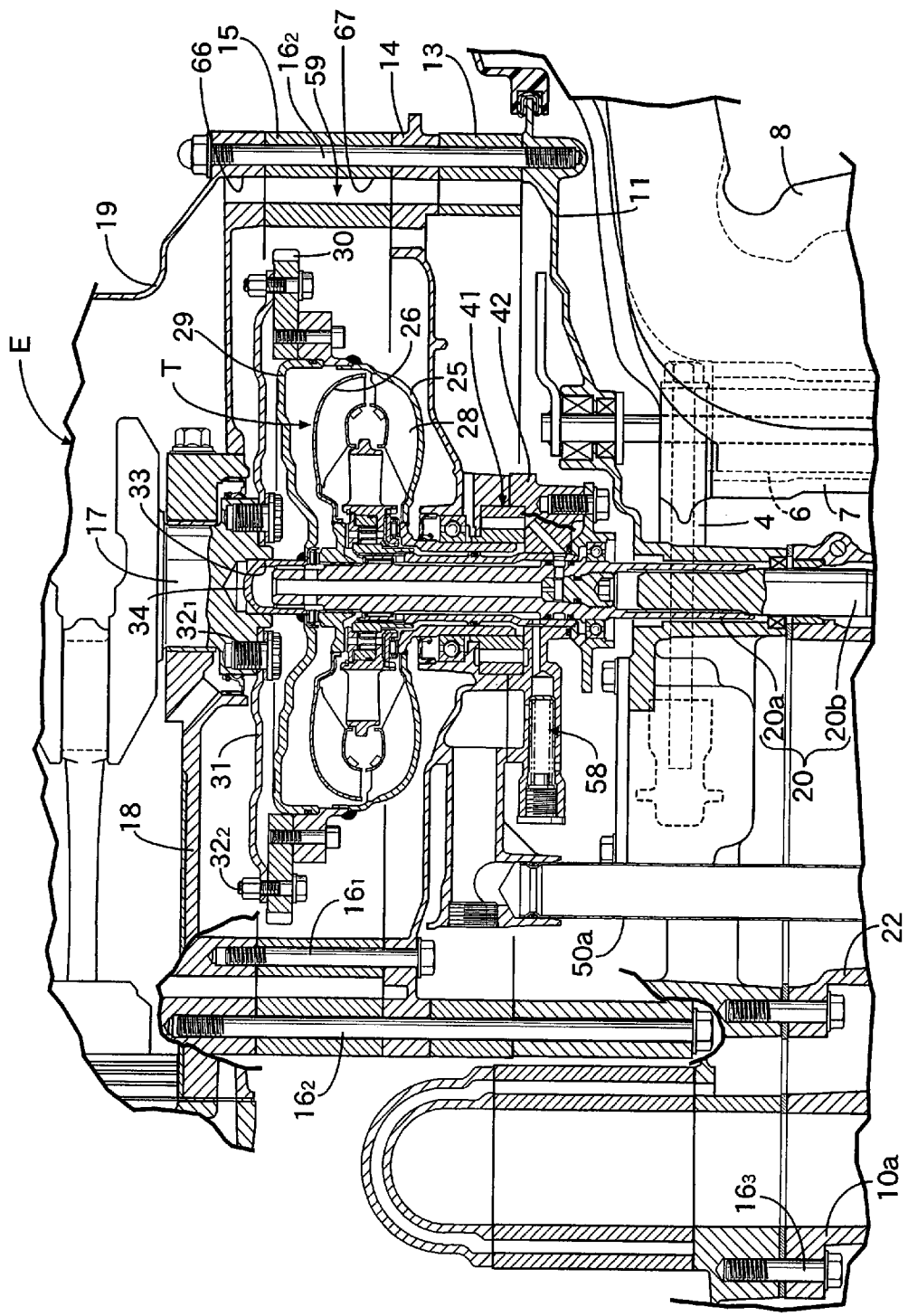
FIG. 2 is an enlarged sectional view showing the portion 2 of FIG. 1.
Figure 3:
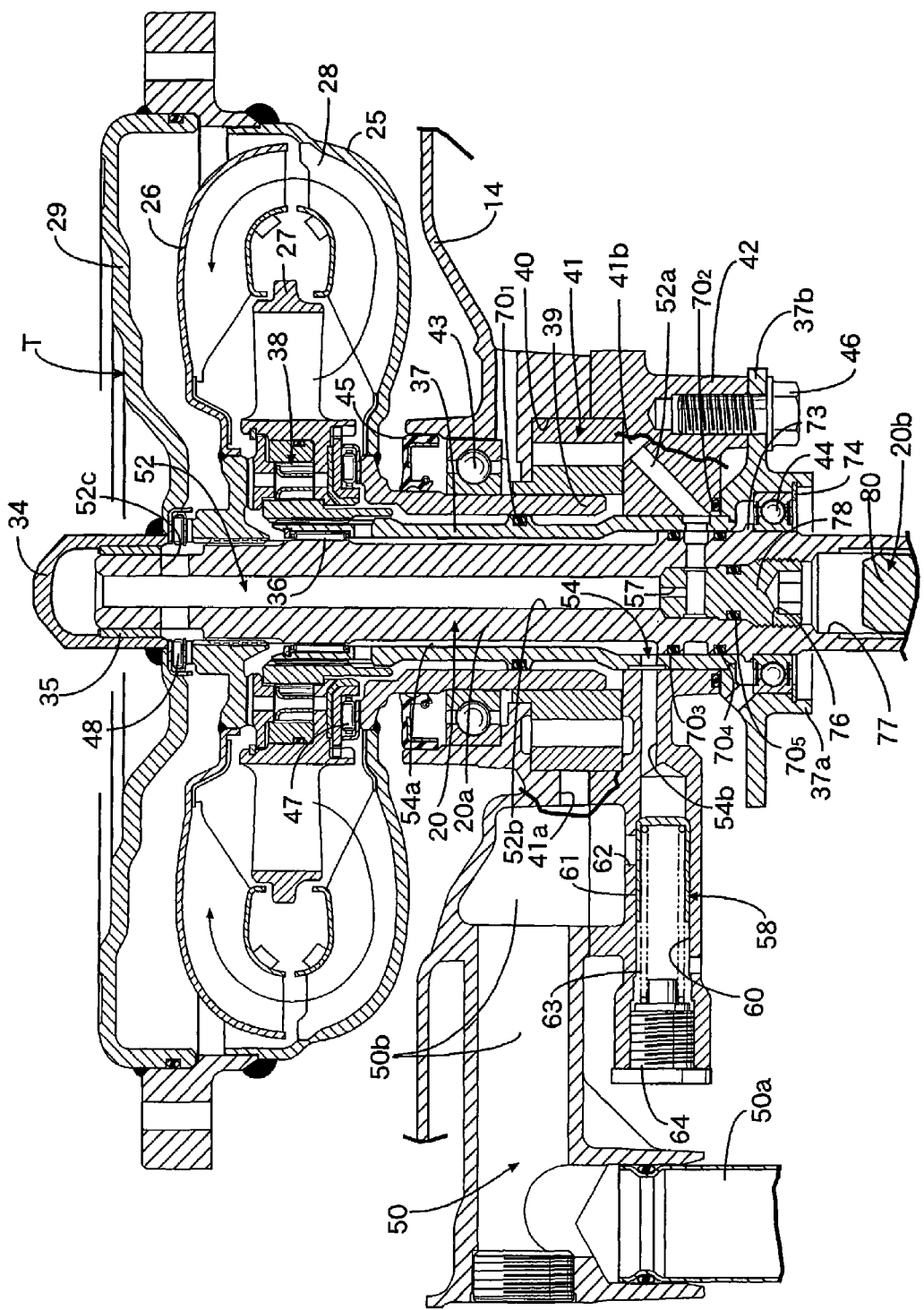
FIG. 3 is an enlarged view showing the essential portions of FIG. 2.
Figure 4:
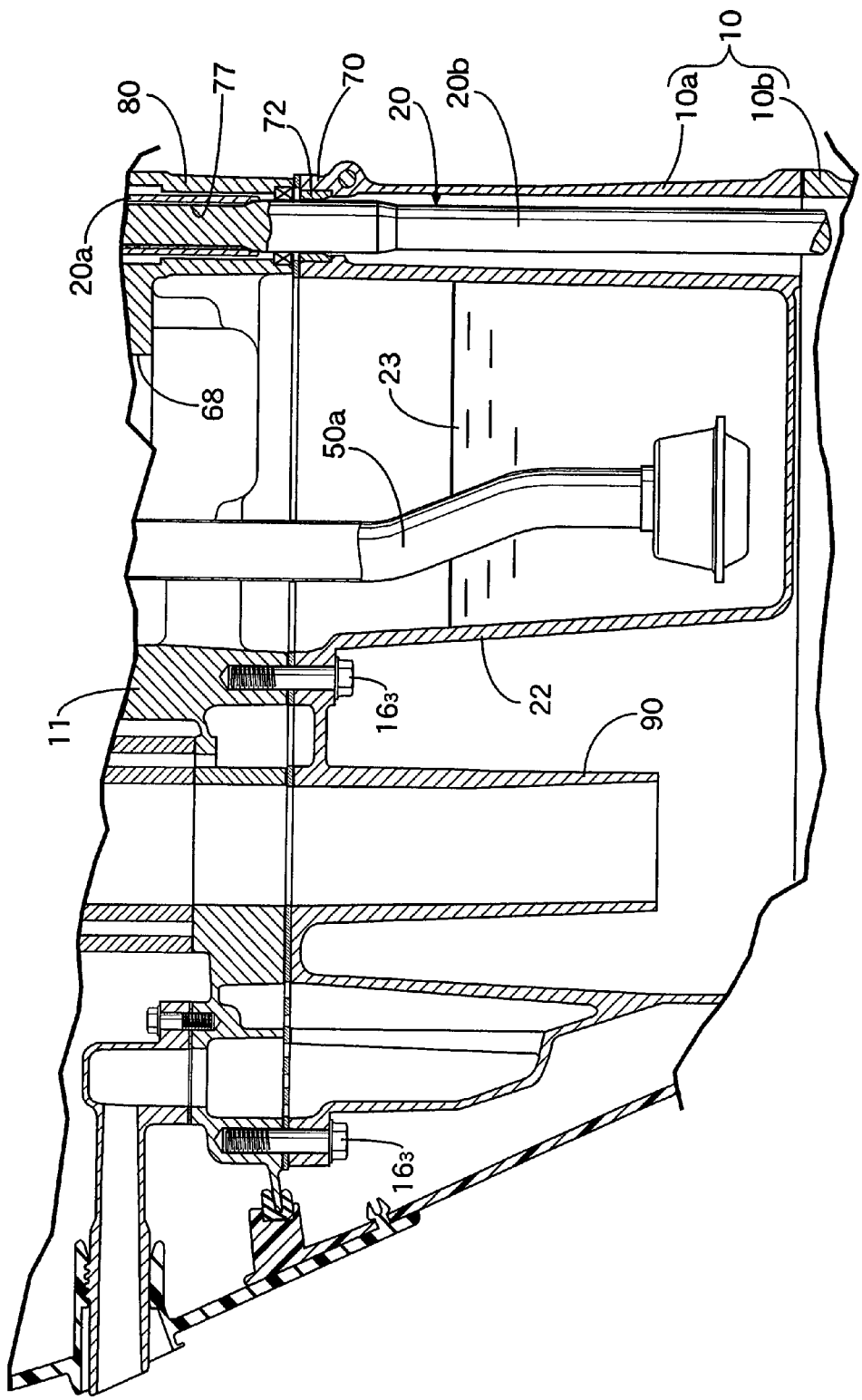
FIG. 4 is an enlarged sectional view showing the portion 4 of FIG. 1.
Figure 5:
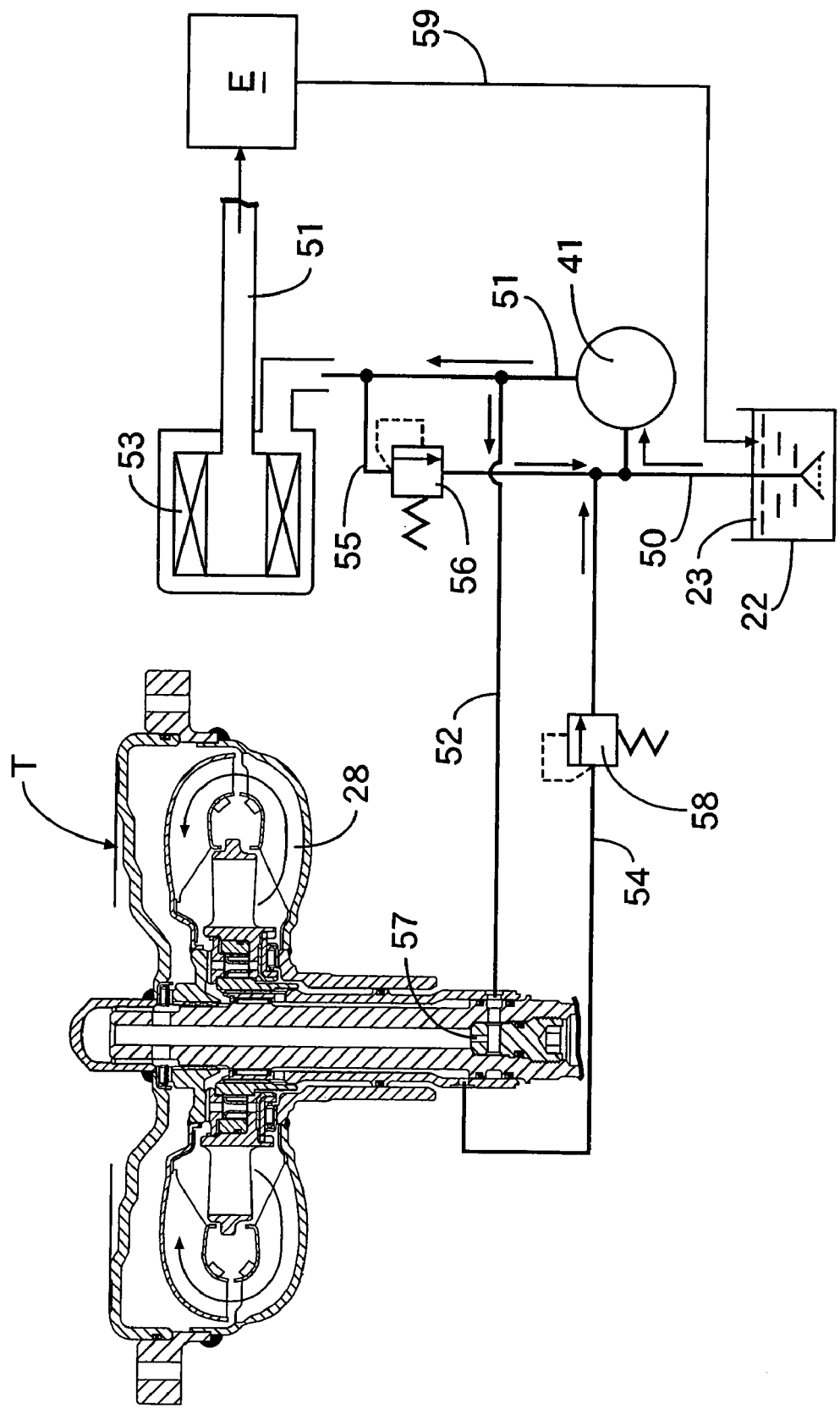
FIG. 5 is a view showing a hydraulic circuit including an oil pump.

In FIG. 2, FIG. 3 and FIG. 4, the above casing 1 includes the extension case 10, the mount case 11 bolt-coupled to an upper end of the extension case 10, and a gear case 12 bolt-coupled to a lower end of the extension case 10. The extension case 10 includes an upper case 10a and a lower case 10b bolt-coupled to the upper case 10a. The mount case 11 is jointed to an upper end surface of the upper case 10a by a plurality of bolts $16_3$.

The casing 1 further includes annular lower distance members 13, an bearing bracket 14, and annular upper distance members 15, which are sequentially superimposed on the upper end of the mount case 11. The engine E is mounted to the upper distance member 15 with the crankshaft 17 being vertically arranged and the cylinder block 18 facing rearward. An bearing bracket 14 and upper distance member 15 are secured to the cylinder block 18 and a bottom wall of the crankcase 19 of the engine E by a plurality of bolts $16_1$. The lower distance member 13, the bearing bracket 14, and the upper distance member 15 are secured to one another by a plurality of bolts $16_2$.

In FIG. 2 and FIG. 3, the torque converter T is vertically arranged in the annular upper distance member 15, and the output shaft 20 coupled to the crankshaft 17 via the torque converter T is vertically arranged in the extension case 10.

The gear case 12 horizontally supports the propeller shaft 3 having the propeller 2 at its rear end, and houses a forward-reverse shifting gear mechanism 21 connecting the propeller shaft 3 to the output shaft 20.

In operation of the engine E, the power thereof is transmitted from the crankshaft 17 to the output shaft 20 via the torque converter T, and further to the propeller shaft 3 via the forward-reverse shifting gear mechanism 21, thereby driving the propeller 2. The rotational direction of the propeller 2 is controlled and switched by the forward-reverse shifting gear mechanism 21.

In the extension case 10, an oil tank 22 open to the mount case 11 is integrally formed with the upper case 10a of the extension case 10. The oil tank 22 stores oil 23 which is used in both lubrication of the engine E and operation of the torque converter T. A downstream end 90 of an exhaust gas passage of the engine E is integrally formed with the upper case 10a.

As clearly shown in FIG. 3, the torque converter T includes a pump impeller 25, a turbine runner 26 arranged above the pump impeller 25 and opposed to the pump impeller 25, a stator 27 arranged between the inner peripheral portions of the pump impeller 25 and the turbine runner 26, and a circulation circuit 28 of working oil which is defined between these three impellers 25 to 27. The three impellers 25 to 27 are arranged to have a common vertical axis, as in the case of the crankshaft 17 and the output shaft 20.

The pump impeller 25 integrally includes a transmission cover 29 for covering an upper surface of the turbine runner 3. A ring gear 30 for starting operation is secured to an outer peripheral surface of the transmission cover 29. A drive plate 31 is secured to the ring gear 30 by a bolt $32_2$. The drive plate 31 is also secured to a lower end surface of the crankshaft 17 by a bolt $32_1$. The torque converter T is suspended from the crankshaft 17 via the drive plate 31.

A cup-shaped supporting cylinder 34 is secured to a central part of the transmission cover 29. The supporting cylinder 34 is fitted into a supporting hole 33 which is open to the central part of the lower end surface of the crankshaft 17. The output shaft 20 has an upper end which extends to the inside of the supporting cylinder 34 and is supported in the supporting cylinder 34 via a bearing bush 35. A hub of the turbine runner 26 is spline-coupled to the output shaft 20. A hollow stator shaft 37 is arranged around the outer periphery of the output shaft 20 so as to be supported by the output shaft 20 via a needle bearing 36. A known free wheel 38 is interposed between the stator shaft 37 and a hub of the stator 27.

A hollow pump shaft 39 is arranged at the outer periphery of the stator shaft 37. The hollow pump shaft 39 is integrally coupled to the pump impeller 25 and extends downward. The pump shaft 39 is supported by the bearing bracket 14 via an upper ball bearing 43 on the side of the outer periphery. An oil pump 41 driven at the lower end portion of the pump shaft 39 is attached to a pump housing 40 formed at a lower surface of the bearing bracket 14. A pump cover 42 covering a lower surface of the oil pump 41 is bolt-coupled to a lower surface of the bearing bracket 14. An oil seal 45 is attached to an upper end portion of the bearing bracket 14 such that its lip is in close contact with an outer peripheral surface of the pump shaft 39 at a position immediately above the ball bearing 43.

The stator shaft 37 has a large diameter portion 37a at its lower end. A flange 37b is integrally formed on an outer periphery of the large diameter portion 37a. The flange 37b is secured to the pump cover 42 by a bolt 46. A lower ball bearing 44 is mounted to its inner periphery of the flange 37b so as to support the output shaft 20.

Therefore, the pump shaft 39 is supported by the bearing bracket 14 via the upper ball bearing 43, and the output shaft 20 is supported by the large diameter portion 37a of the stator shaft 37 via the lower ball bearing 44, thereby reasonably supporting the pump shaft 39, the stator shaft 37, and the output shaft 20 and downsizing the vertical fluid power transmission including the torque converter T and output shaft 20.

Because the oil pump 41 is mounted to the bearing bracket 14 in a space between the upper and lower ball bearings 43 and 44, thereby downsizing the vertical fluid power transmission having the oil pump 41.

A thrust needle bearing 47 is interposed between the pump impeller 25 and the hub of the stator 27. A thrust needle bearing 48 is interposed between the hub of the turbine runner 26 and the transmission cover 29.

The oil pump 41 draws up the oil stored in the oil tank 22, and supplies the oil to the engine E and the torque converter T. The route of the oil discharged by the oil pump 41 will be described below with reference to FIG. 5.

The oil pump 41 draws up the oil 23 stored in the oil tank 22 via an oil suction passage 50, and discharges the oil 23 to a first oil supply passage 51. The oil discharged to first oil supply passage 51 is filtered by an oil filter 53 provided in the middle of the first oil supply passage 51, and supplied to a lubricated portion of the engine E. After the lubrication, the oil flows downward to the bottom portion of the crankcase 19 of the engine E, and returns to the oil tank 22 via the first oil return passage 59.

The oil discharged to the first oil supply passage 51 is also supplied to a circulation circuit 28 of the torque converter T via a second oil supply passage 52 which is a branch from the first oil supply passage 51 upstream of the oil filter 53. After being used in the circulation circuit 28, the oil is returned to the oil suction passage 50 or the oil tank 22 via a second oil return passage 54.

An oil relief passage 55 is another branch from the first oil supply passage 51 upstream of the oil filter 53, and reaches the oil suction passage 50. The oil relief passage 55 has a pressure relief valve 56 which opens when an oil pressure of the first oil supply passage 51 exceeds a specified value.

The second oil supply passage 52 has an orifice 57 for controlling the amount of the oil supplied to the circulation circuit 28 of the torque converter T. The second oil return passage 54 also has a normally-closed pressure response valve 58 which opens when an oil pressure upstream of the second oil return passage 54 exceeds a predetermined value.

Thus, when the pressure of the first oil supply passage 51 is regulated by the single pressure relief valve 56, the pressure of the second oil supply passage 52 is concurrently regulated, whereby the pressure of the circulation circuit 28 in the torque converter T is regulated, and the transmission characteristics of the torque converter T can be stabilized. In addition, the downstream end of the oil relief passage 55 is connected to the oil suction passage 50, whereby the oil released from the oil relief passage 55 is smoothly returned to the oil pump 41, thereby simplifying the oil pressure circuit.

Again, in FIG. 2 and FIG. 3, the oil suction passage 50 is suspended from the bearing bracket 14, and includes a suction tube 50a having a lower end portion extending into the oil tank 22, and a lateral oil passage 50b which is provided in the bearing bracket 14 so as to communicate the upper end portion of the suction tube 50a with a suction port 41a of the oil pump 41.

The second oil supply passage 52 includes a bottomed vertical hole 52b which is provided at a central portion of the output shaft 20 so as to open in the upper end surface of the output shaft 20, an inlet oil passage 52a which is provided to pass through the fitted portions between the pump cover 42, the stator shaft 37 and the output shaft 20 so as to communicate a discharge port 41b of the oil pump 41 with the lower portion of the vertical hole 52b, and a horizontal hole 52c which is provided at an upper part of the vertical hole 52b so as to pass through the peripheral portion of the thrust needle bearing 48 into the transmission cover 29.

The second oil return passage 54 includes a cylindrical oil passage 54a which is defined between the output shaft 20 and the stator shaft 37 and is in communication with the circulation circuit 28 through the peripheral portion of the thrust needle bearing 47 above the hub of the pump impeller 25, and a lateral outlet oil passage 54b which is provided at the pump cover 42 to communicate with the lower end portion of the cylindrical oil passage 54a. The outlet oil passage 54b is in communication with the lateral oil passage 50b via the pressure response valve 58.

The pressure response valve 58 includes a cylindrical valve chamber 60 horizontally provided in the pump cover 42, and a piston-type valve body 61 slidably fitted in the valve chamber 60. The outlet oil passage 54b is open to the inner end surface of the valve chamber 60. A valve hole 62 is open in the inner side surface of the valve chamber 60 so as to communicate with the lateral oil passage 50b or the oil tank 22. The valve body 61 is arranged so that its top surface, that is, pressure receiving surface is directed toward the outlet oil passage 54b. The valve hole 62 is closed when the valve body 61 is advanced toward the outlet oil passage 54b, and is opened when the valve body 61 is retracted. A valve spring 63 is arranged between the rear surface of the valve body 61 and the screw plug 64 screwed into the opening of the valve chamber 60 so as to urge the valve body 61 to the advancing direction, that is, to the valve closing direction. Therefore, the valve body 61 is normally held at its closed position by a set load of the valve spring 63 to thereby block the second oil return passage 54. When an oil pressure is generated upstream of the second oil return passage 54 and exceeds a predetermined value, the top surface of the valve body 61 receives the oil pressure, and the valve body 61 is caused to retract against the set load of the valve spring 63 to be opened, whereby the second oil return passage 54 enters a communicated state.

An opening 66 (see FIG. 2) is provided in a bottom wall of the crankcase 19 of the engine E. The oil having completed the lubrication of the engine E is discharged through the opening 66. The opening 66 is opened in the upper surface of the mount case 11 through a series of vertical through holes 67 which are formed in the upper distance member 15 and the peripheral portion of the bearing bracket 14, and through the inner side portion of the annular lower distance member 13. The mount case 11 has an opening 68 which is open to the oil tank 22. Therefore, the oil which flows into the bottom portion of the crankcase 19 after completing the lubrication of the engine E is directed to return to the oil tank 22 via the opening 66, through holes 67 and the opening 68. The opening 66, the through holes 67, and the opening 68 form the first oil return passage 59.

In FIG. 3, a first seal member $70_1$ is attached to the outer periphery of the stator shaft 37 so as to closely contacts the inner peripheral surface of the pump shaft 39 in a relatively rotatable manner, thereby preventing the oil in the torque converter T from flowing downward of the pump shaft 39.

A second seal member $70_2$ is provided between the stator shaft 37 and the pump cover 42 at a position below the inlet oil passage 52a, thereby preventing the oil in the inlet oil passage 52a from flowing downward of the stator shaft 37 and the pump cover 42.

Third and fourth seal members $70_3$ and $70_4$ are provided around the outer periphery of the output shaft 20 in the fitted portions of the output shaft 20 and the stator shaft 37 such that they are arranged in the vertical direction to closely contact from above and below the inner peripheral surface of the stator shaft 37 in a relatively rotatable manner. The third and fourth seal members $70_3$ and $70_4$ cooperate to prevent the oil in the inlet oil passage 52a from flowing out of the fitted portions of the output shaft 20 and the stator shaft 37. Further, the upper seal member $70_3$ prevents the oil in the inlet oil passage 54a from flowing downward to the fitted portions of the output shaft 20 and the stator shaft 37.

As shown in FIG. 3 and FIG. 4, the output shaft 20 is divided into an upper output shaft 20a having the vertical hole 52b and supported by the lower ball bearing 44, and a lower output shaft 20b coupled to the forward-reverse shifting gear mechanism 21 (see FIG. 1). An upper end portion of the lower output shaft 20b is supported via a bush 72 in a supporting sleeve 71 which is integrally formed with the outer side of the oil tank 22. The upper output shaft 20a has a flange 73 which abuts on the upper end surface of the inner lace of the ball bearing 44 attached to the inner periphery of the large diameter portion 37a of the stator shaft 37. A stopper collar 74 is locked to the inner peripheral surface of the large diameter portion 37a so as to support the lower end surface of an outer lace of the ball bearing 44. Therefore, unless the stopper collar 74 is removed, the upper output shaft 20a cannot be pulled out downward from the central portion of the torque converter T.

Besides the vertical hole 52b, the upper output shaft 20a has a plug hole 76 connected to the lower end of the vertical hole 52b, and a spline hole 77 connected to the lower end of the plug hole 76 and open in the lower end surface of the upper output shaft 20a. A plug 78 is screwed into the plug hole 76 to form the bottom wall of the vertical hole 52b. The plug 78 has a part of the inlet oil passage 52a, and the orifice 57 for communicating the inlet oil passage 52a with the vertical hole 52b. A fifth seal member $70_5$ is attached to the plug 78 to closely contact the inner peripheral surface of the plug hole 76.

The inlet oil passage 52a may be formed to bypass the plug 78.

A spline shaft 80 is formed at the upper end portion of the lower output shaft 20b. The spline shaft 80 is fitted into the spline hole 77 to couples the upper and lower output shafts 20a and 20b to each other.

Now, operation of the first embodiment will be described below.

In operation of the engine E, the oil pump 41 is driven by the pump shaft 39 to draw up the oil 23 in the oil tank 22 through the oil suction passage 50, that is, through the suction tube 50a and the lateral oil passage 50b, and discharges the drawn-up oil 23 to the first oil supply passage 51 and the second oil supply passage 52. The oil discharged to the first oil supply passage 51 is supplied to the lubricated portion of the engine E, as described above.

Meanwhile, the oil supplied to the second oil supply passage 52 sequentially passes through the inlet oil passage 52a and the orifice 57; ascend through the vertical hole 52b of the upper output shaft 20a to go out of the horizontal hole 52c; enters the transmission cover 29 while lubricating the thrust needle bearing 48; and then flows into the transmission cover 29 from the outer peripheral side of the turbine runner 26.

The oil in the circulation circuit 28 circulates as shown by an arrow in FIG. 3 with the rotation of the pump impeller 25 to transmit the rotational torque of the pump impeller 25 to the turbine runner 26, thereby driving the output shaft 20. At this time, if the torque is amplified between the pump impeller 25 and the turbine runner 26, the reaction force due to the amplification is borne by the stator 27, which is fixed there by the locking operation of the free wheel 38. Such a torque amplifying effect of the torque converter T strongly drives the propeller 2, thereby effectively improving start and acceleration of a ship.

After the amplification, the stator 27 rotates in the same direction together with the pump impeller 25 and the turbine runner 26 due to the reversal in the torque direction while causing the freewheel 38 to run idle.

After being used at the circulation circuit 28, the oil runs down the cylindrical oil passage 54a while lubricating the thrust needle bearing 47 above the hub of the pump impeller 25, and enters the valve chamber of the pressure response valve 58 from the outlet oil passage 54b.

The oil having entered the valve chamber 60 exerts a pressure to press the valve body 61 of the pressure response valve 58 against the set load of the valve spring 63, whereby the valve body 61 is opened to open the valve hole 62, so that the oil returns from the valve chamber 60 through the valve hole 62 into the oil suction passage 50 or the oil tank 22. In this way, the oil circulates between the circulation circuit 28 of the torque converter T and the oil tank 22 arranged below the torque converter T through the second oil supply passage 52 and the second oil return passage 54. Therefore, it is possible to downsize the torque converter T, and promote the cooling of the circulating oil to prevent degradation of the oil.

In particular, since the oil tank 22 arranged below the torque converter T is separated from the engine E, the oil tank 22 is not much heated by the engine E, the oil tank 22 can have a relatively large capacity without any interference by the engine E and the torque converter T, and thus can increase the amount of oil flowing into the circulation circuit 28, thereby further promoting the cooling of the circulating oil. Further, the engine E, the torque converter T, and the oil tank 22 are sequentially arranged from top to bottom, and the torque converter T can be downsized without any interference by the oil tank 22, thereby reducing the size and weight of the outboard engine system O including these components.

The oil discharged from the oil pump 41 for lubricating the engine E is also supplied to the circulation circuit 28, which eliminates any addition/expansion of the oil tank 22 and the oil pump 41 for supplying the oil to the circulation circuit 28, thereby avoiding an increase of size and a complication of the outboard engine system O.

The elongated output shaft 20 is divided into two portions, that is, the upper output shaft 20*a* and lower output shaft 20*b* which are retractably spline-connected to each other. The upper output shaft 20*a* is coupled to the stator shaft 37 in the axial direction via the lower ball bearing 44 and the stopper collar 74. Therefore, the torque converter T, the bearing bracket 14, the pump cover 42, and the upper output shaft 20*a* are compactly incorporated into a single unit as a vertical power transmission without any interference by the lower output shaft 20*b*, thereby facilitating assemblability of the vertical power transmission and mountability of the vertical fluid power transmission to the outboard engine system O.

Further, if the gear case 12 is separated from the extension case 10 for maintenance of the forward-reverse shifting gear mechanism 21 for example, the lower output shaft 20*b* can be separated downward together with the gear case 12 while the upper output shaft 20*a* is remained on the torque converter T side by pulling the spline shaft 80 of the lower output shaft 20*b* out of the spline hole 77 of the upper output shaft 20*a*. Therefore, it is possible to easily perform the maintenance of the forward-reverse shifting gear mechanism 21, and further avoid disassembly of the vertical fluid power transmission to easily reassemble the gear case 12 into the system.

Furthermore, since the bottom wall of the vertical hole 52 as a part of the second oil supply passage 52*b*, that is, the plug 78 is screwed into the upper output shaft 20*a* of the vertical fluid power transmission, the oil is prevented from flowing out of the vertical hole 52*b* and going downward of the upper output shaft 20*a*. In this case, although the bottom wall of the vertical hole 52*b* may be integrally formed with the upper output shaft 20*a*, the vertical hole 52*b*, the plug hole 76, and the spline hole 77 are arranged to axially pass through the upper output shaft 20*a* if the plug 78 is used. Therefore, after processing of these holes, washing can advantageously reliably prevent cut chips from residing in these holes.

The same is true in the case where the engine E and the torque converter T are removed from the mount case 11, which facilitates maintenance of these components.

Moreover, the engine E is mounted to the mount case 11 via the bearing bracket 14 supporting the pump shaft 39 of the torque converter T, the upper distance member 15 connected to the upper end of the bearing bracket 14 to surround the torque converter T, and the lower distance member 13 connected to the lower end of the bearing bracket 14. Therefore, it is possible to easily mount the engine E to the mount case 11 without any interference by the torque converter T, thereby providing an excellent assemblability.

The oil pump 41 is attached to the pump housing 40 formed on the lower surface of the bearing bracket 14 and holds the pump cover 42. Therefore, the bearing bracket 14 supports not only the torque converter T but also the oil pump 41, thereby simplifying the support structure of the oil pump 41.

When the operation of the engine E is terminated, also the operation of the oil pump 41 is terminated, so that in the pressure response valve 58, the pressure of the valve chamber 60 is decreased and the valve body 61 is closed by the set load of the valve spring 63. This causes the outlet oil passage 54*b* to enter the blocked state, and prevents the oil from flowing from the circulation circuit 28 of the torque converter T into the oil tank 22, thereby keeping the circulation circuit 28 filled with the oil. Therefore, it is possible to enhance the responsiveness of operation of the torque converter T.

Further, a part of the second oil supply passage 52 comprises the vertical hole 52*b* which is provided at a central portion of the output shaft 20 so as to communicate at an upper portion with the circulation circuit 28, thereby simplifying the structure of the second oil supply passage 52. Furthermore, when the engine E is stopped, the vertical hole 52*b* prevents the oil from flowing back from the circulation circuit 28 to the oil pump 41.

The present invention is not limited to the above described embodiment, and various modifications in design can be made without departing from the subject matter of the present invention. For example, the oil tank 22 may be divided into a section for storing working oil for the torque converter T and a section for storing lubrication oil for the engine E, and oil suitable for each purpose is stored in each section. Further, the power may be input from the engine E through a reduction gear into the torque converter T, and the power may be transferred from the torque converter T through the reduction gear into the output shaft 20.

What is claimed is:

1. A vertical power unit comprising:
   an engine which has a vertically arranged crankshaft;
   a vertically arranged output shaft provided below the crankshaft; and
   a torque converter disposed between the crankshaft and the output shaft, the torque converter including:
     a pump impeller connected to the crankshaft;
     a turbine runner connected to the output shaft so as to be opposed to the pump impeller;
     a stator arranged between the pump impeller and the turbine runner; and
     a circulation circuit of a power transmission oil, the circuit being defined between the pump impeller, turbine runner and stator,
   wherein the output shaft comprises an upper output shaft connected to the turbine runner and a lower output shaft arranged coaxially with the upper output shaft and separably connected to a lower end portion of the upper output shaft;
   wherein the vertical power unit further comprises, outside the torque converter, an oil tank, and an oil pump for drawing up oil in the oil tank; and
   wherein the upper output shaft is provided with a vertical hole which communicates at an upper end with the circulation circuit so as to introduce the oil discharged by the oil pump into the circulation circuit, and a bottom wall which closes a lower end of the vertical hole.

2. The vertical power unit according to claim 1, wherein the upper output shaft is provided with the vertical hole, a plug hole, and a spline hole so that they axially pass through the upper output shaft; a plug is attached to the plug hole so as to serve as the bottom wall; and a spline shaft is removably fitted to the spline hole, the spline shaft being formed at an upper end of the lower output shaft.

3. The vertical power unit according to claim 1 or 2, further comprising: a hollow stator shaft disposed on a periphery of the upper output shaft, and is coupled to the stator via a free wheel to extend downward; and a hollow pump shaft disposed on a periphery of the stator shaft, and is coupled to the pump impeller to extend downward, wherein the pump shaft is supported by a support member via an upper bearing, a lower end portion of the stator shaft is fixed to the support member, and the lower output shaft is supported by a lower end portion of the stator shaft via a lower bearing.

4. The vertical power unit according to claim 3, wherein the oil pump driven by the pump shaft is mounted to the support member between the upper and lower bearings.

5. The vertical power unit according to claim 4, further comprising: an inlet oil passage extending from the support member to the stator shaft and the upper output shaft to communicate a discharge port of the oil pump with the vertical hole; and a pair of seal members which are vertically arranged to sandwich the inlet oil passage at a relatively rotatable fitted portion between the upper output shaft and the stator shaft.

6. The vertical power unit according to claim 5, wherein a cylindrical oil passage is defined above the pair of seal members and between the upper output shaft and the stator shaft so that oil discharged from the circulation circuit is guided to run down to a suction side of the oil pump or the oil tank.

7. An outboard engine system comprising:
a casing coupled to a swivel case via a swivel shaft;
an engine mounted in an upper part of the casing such that a crankshaft of the engine is vertically arranged and a cylinder block of the engine faces in a direction opposite to the swivel shaft;
a torque converter;
a vertically arranged output shaft connected to the crankshaft through the torque converter; and
a horizontally arranged propeller shaft provided below the output shaft; and
a forward-reverse shifting gear mechanism for providing a connection between the output shaft and the propeller shaft;
the torque converter, the output shaft, the propeller shaft and the forward-reverse shifting gear mechanism being disposed in the casing;
wherein the output shaft comprises an upper output shaft connected to a turbine runner and a lower output shaft arranged coaxially with the upper output shaft and separably connected to a lower end portion of the upper output shaft;
wherein the vertical power unit further comprises an oil tank in the casing below the torque converter, and an oil pump for drawing up oil in the oil tank; and
wherein the upper output shaft is provided with a vertical hole which communicates at an upper end with a circulation circuit so as to introduce the oil discharged by the oil pump into the circulation circuit, and a bottom wall which closes a lower end of the vertical hole.

8. An outboard engine system comprising:
a casing;
an engine which has a vertically arranged crankshaft and is mounted in an upper portion of the casing,
a torque converter;
a vertically arranged output shaft connected to the crankshaft through the torque converter; and
a horizontally arranged propeller shaft provided below the output shaft;
a forward-reverse shifting gear mechanism for providing a connection between the output shaft and the propeller shaft,
the torque converter including:
a pump impeller connected to the crankshaft;
a turbine runner connected to the output shaft so as to be opposed to the pump impeller;
a stator arranged between the pump impeller and the turbine runner; and
a circulation circuit of a power transmission oil, the circuit being defined between the pump impeller, turbine runner and stator,
wherein the torque converter is mounted in the upper portion of the casing together with the engine;
wherein the casing further contains: an oil tank; an oil pump for drawing up oil stored in the oil tank; an oil supply passage for supplying the oil discharged by the oil pump to the circulation circuit; and a return passage for returning the oil in the circulation circuit to a suction side of the oil pump or the oil tank; and
wherein the oil tank is positioned in the casing below the torque converter and sidewardly of the output shaft.

9. The outboard engine system according to claim 8, wherein the casing comprises a plurality of case parts which are vertically stacked and joined to each other, and the oil tank is formed in one of the case parts.

10. The outboard engine system according to claim 8 or 9, further comprising: a hollow stator shaft which is disposed on a periphery of the upper output shaft, and is coupled to the stator to extend downward; and a hollow pump shaft which is disposed on a periphery of the stator shaft, and is coupled to the pump impeller to extend downward, wherein the engine is mounted to the upper portion of the casing through a bearing bracket and a distance member, the bearing bracket supporting the pump shaft via a bearing, the distance member being connected to an upper end of the bearing bracket to surround the torque converter, and the oil pump is mounted to the bearing bracket.

11. The outboard engine system according to claim 8 or 9, wherein the casing comprises a mount case part to which the engine is mounted together with the torque converter, an extension case part which is joined to a lower end of the mount case part and houses the output shaft, and a gear case which is joined to a lower end of the extension case part and houses the forward-reverse shifting gear mechanism and the propeller shaft; and the output shaft comprises an upper output shaft supported by the mount case part, and a lower output shaft separably connected to a lower end portion of the upper output shaft and is connected to the forward-reverse shifting gear mechanism.

* * * * *